(12) United States Patent
Telmadarreie et al.

(10) Patent No.: US 12,421,442 B2
(45) Date of Patent: Sep. 23, 2025

(54) NANOPARTICLE-SURFACTANT STABILIZED FOAMS

(71) Applicant: Cnergreen Corp., Calgary (CA)

(72) Inventors: Ali Telmadarreie, Calgary (CA); Mingzhe Dong, Calgary (CA); Steven L. Bryant, Calgary (CA)

(73) Assignee: Cnergreen Corp., Calgary (CA)

( * ) Notice: Subject to any disclaimer, the term of this patent is extended or adjusted under 35 U.S.C. 154(b) by 49 days.

(21) Appl. No.: 17/442,295

(22) PCT Filed: Mar. 25, 2020

(86) PCT No.: PCT/CA2020/050390
§ 371 (c)(1),
(2) Date: Sep. 23, 2021

(87) PCT Pub. No.: WO2020/191491
PCT Pub. Date: Oct. 1, 2020

(65) Prior Publication Data
US 2022/0162497 A1    May 26, 2022

Related U.S. Application Data

(60) Provisional application No. 62/824,910, filed on Mar. 27, 2019.

(51) Int. Cl.
*C09K 8/584*    (2006.01)
*C09K 8/588*    (2006.01)
*C09K 8/594*    (2006.01)

(52) U.S. Cl.
CPC .............. *C09K 8/584* (2013.01); *C09K 8/588* (2013.01); *C09K 8/594* (2013.01); *C09K 2208/10* (2013.01)

(58) Field of Classification Search
CPC .......... C09K 8/584; C09K 8/594; C09K 8/70; C09K 8/703; C09K 2208/10
See application file for complete search history.

(56) References Cited

U.S. PATENT DOCUMENTS

| | | | |
|---|---|---|---|
| 3,368,624 A | 2/1968 | Heuer et al. | |
| 6,586,483 B2 | 7/2003 | Kolb et al. | |
| 2010/0096139 A1* | 4/2010 | Holcomb | C09K 8/70 166/308.1 |

OTHER PUBLICATIONS

"Foams Stabilized by In Situ-Modified Nanoparticles and Anionic Surfactants for Enhanced Oil Recovery", Yang, et al., Energy& Fuels, 2017, 31, 4721-4730 (Year: 2017).*
Alargova, R.G., et al., "Foam Superstabilization by Polymer Microrods" Langmuir 20 (24): 10371-10374, 2004.
Binks, B.P., et al., "Aqueous foams stabilized solely by silica nanoparticles", Angew. Chem., Int. Ed., 44 (24): 3722-3725, 2005.

(Continued)

*Primary Examiner* — Aiqun Li
(74) *Attorney, Agent, or Firm* — Benesch Friedlander Coplan & Aronoff LLP

(57) ABSTRACT

Stabilized foams are provided, adapted in particular for subterranean applications in hydrocarbon recovery operations. The foams are stabilized with surfactant-decorated nanoparticles, and the decoration of the nanoparticles with surfactant may be titrated to tune the stabilization of the foam.

9 Claims, 7 Drawing Sheets

(56) References Cited

OTHER PUBLICATIONS

Cervantes Martinez, et at., "On the origin of the remarkable stability of aqueous foams stabilised by nanoparticles: link with microscopic surface properties", Soft Matter 4, 1531, 2008, https://doi.org/10.1039/b804177f.

Chen, Y., et al., "Ethoxylated Cationic Surfactants for CO2 EOR in High Temperature, High Salinity Reservoirs", Paper SPE 154222 presented at the SPE Improved Oil Recovery Symposium, Apr. 14-18, Tulsa, Oklahoma, USA. 2012.

Doroudian Rad, M., et al., "Insight on Methane Foam Stability and Texture via Adsorption of Surfactants on Oppositely Charged Nrmoparticles". Langmuir, Nov. 27, 2018 (Nov. 27, 2018), vol. 34 (47), pp. 14274-14285, [online] [retrieved on Jun. 23, 2020 (Jun. 23, 2020)]. Retrieved from the Internet -chttps-J/pubs.acs.org/doi/pdV10.1021/acs.langmuir.8b01966>.

Doroudian Rad, Mina, "Natural Gas Foam Stabilization by a Mixture of Oppositely Charged Nanoparticle and Surfactant and the Underlying Mechanisms". Master's thesis, Graduate Studies, University of Calgary, Canada, Aug. 29, 2018 (Aug. 29, 2018), PRISM: https:((prism.ucalgary.ca), [online] [retrieved from the Internet on Jun. 23, 2020 (Jun. 23, 2020)]. <hrips://prism.ucalgary.ca/bitstream/handle/1880/107706/ucalgary_2018 doroudianrad mina.pd f?sequence=1&isAllowed=y>.

Espinoza Da, et al., "Nanoparticle-stabilized supercritical CO2 foams for potential mobility control applications", SPE Improved Oil Recovery Symposium, Tulsa, Oklahoma. Society of Petroleum Engineers, (2010).

Gonzenbach, U.T, et al., "Ultrastable Particle-Stabilized Foams", Angew. Chem., Int. Ed. 45 (21): 3526-3530, 2006.

Grigg, R.B. et al., "Effects of Flow Conditions and Surfactant Availability on Adsorption", Paper SPE 106205 presented at the International Symposium on Oilfield Chemistry, Feb. 28-Mar. 2, Houston, Texas, USA, 2007.

Harris, P. C., et al., "High-Quality Foam Fracturing Fluids", Society of Petroleum Engineers. doi:10.2118/35600-MS (Jan. 1, 1996).

Hirasaki, G.J., "The Steam-Foam Process", J. Petr. Technol. 41 (05): 449-456, 1989.

Hoefner, M.L., et al., "CO2 foam: results from four developmental field trials", SPERE 10 (4), 273-281, 1995.

International Search Report and Written Opinion for PCT International Application Serial No. PCT/CA2020/050390 dated Jun. 30, 2020.

Kibodeaux, K.R. et al., "Coreflood Study of Surfactant-Alternating-Gas Foam Processes: Implications for Field Design", Paper SPE 38318 presented at the SPE Western Regional Meeting, Jun. 25-27, Long Beach, California, USA, 1997.

Lv, Q. et al., Study of Nanoparficle—Surfactant-Stabilized Foam as a Fracturing Fluid', Ind. Eng. Chem. Res., vol. 54 (28), pp. 9468-9477, Sep. 9, 2015 (Sep. 9, 2015).

Maestro et al., "Foams stabilised by mixtures of nanoparticles and oppositely charged surfactants: relationship between bubble shrinkage and foam coarsening". Soft Matter, 2014, vol. 10(36), pp. 6975-6983, [online] [retrieved on Jun. 23, 2020 (Jun. 23, 2020)]. Retrieved from the Internet https://eds.a.ebscohost.com/eds/cletail/detail7vid=18esidle6619a-254c-4bbd-bc63-3f6b395925db°440sdc-vsessmgrOI& bdata=kNpdGU9ZWRzLWxpdmU%3d#AN=RN3584481718cdb-dsbl.

Patzek, T.W., "Field Applications of Steam Foam for Mobility Improvement and Profile Control", SPERE 11 (2): 79-86, 1996.

Singh, R., et al., "Foams Stabilized by In-Situ Surface-Activated Nanoparticles in Bulk and Porous Media", SPEJ, 21 (01): 21-130, 2016.

Smith DH. (ed.), "Surfactant-Based Mobility Control: Progress in Miscible-Flood Enhanced Oil Recovery", ACS Symp. Ser. No. 373, Am. Chem. Soc., Washington, D.C., 1988.

Yekeen, N. et al, A comprehensive review of experimental studies of nanoparticles-stabilized foam for enhanced oil recovery', Journal of Petroleum Science and Engineering, May 1, 2018 (May 1, 2018) vol. 164, pp. 43-74.

Zhang, Y., et al., "New and Effective Foam Flooding to Recover Oil in Heterogeneous Reservoir", Paper SPE 59367 presented at the SPE/DOE Improved Oil Recovery Symposium, Apr. 3-5, Tulsa, Oklahoma, 2000.

\* cited by examiner

NANOPARTICLE-SURFACTANT STABILIZED FOAMS

FIELD

The invention relates to foams, particularly foams adapted for subterranean use in hydrocarbon recovery operations. The foams are stabilized with surfactant-decorated nanoparticles, and the decoration of the nanoparticles with surfactant may be titrated to tune the stabilization of the foam.

BACKGROUND

A foam is a type of emulsion, made up of an internal phase and an external phase (the external phase forming what is generally called the continuous phase). The internal phase of a foam is generally a gas phase, and the external phase is a liquid. In porous media, such as a subterranean formation, the liquid phase of a foam may be in contact with the matrix of pore walls such that the gas phase consists primarily of individual bubbles separated by liquid partitions, with the foam propagating within the porous media (such as a hydrocarbon reservoir) as a system in which gas bubbles and liquid lamella films move in concert.

Foams are generally metastable, and foam breakdown may result from thinning of liquid films to the point of rupture. Foam breakdown results in the gas phase transitioning from a plurality of smaller bubbles into a plurality of larger bubbles or into a complete separation of the gas a liquid phase components. External effects, such as contact with a foam breaker (e.g. a hydrocarbon or saline media) can facilitate foam breakdown.

Gas injection for oil recovery rarely exhibits good sweep efficiency because of high gas mobility and reservoir heterogeneity. This is typically the case for all gases—natural gas, $N_2$, $CO_2$—commonly used for reservoir recovery processes. Conventionally, surfactants have been used to generate foams to increase the apparent viscosity of the gas, but many such efforts have failed to provide long-term stability under reservoir conditions, especially in the presence of oil. Moreover, surfactants have a strong tendency to adsorb on mineral surfaces, rendering them unable to stabilize foam.

Foams may be tailored for a wide variety of applications in the oil and gas industry, including gas coning blocking foams (Heuer and Jacocks, 1968), foams for well stimulation, foams as a fracturing fluids (Harris, 1992), and foams for enhanced oil recovery (EOR) operations, i.e. CO2 foam, foam injection in gas miscible flooding, and steam foam. Since the 1960s, there have been several field trials of surfactant injection with gas into the subsurface to generate foam (Patzek, 1996). Foam has shown potential for improving reservoir sweep efficiency, compared to gas injection, in EOR projects (Hirasaki 1989; Smith 1988). The effective viscosity of foam is much higher than that of gas, so that it can reduce viscous fingering and gravity override caused by injecting gas, supercritical CO2 or steam. Besides improving sweep efficiency in gas flooding, foam can be used for mobility control in chemical EOR where the foam may be considered an alternative to polymer mobility control in micellar flooding (Lake, 1989). For instance, Zhang et al. (2000) reported laboratory and field studies of foam use in the Daqing oilfield in China, where the foam was successfully applied in a heterogeneous porous media and the results compared with the performance of chemical flooding. Hoefner et al. (1995) studied CO2 foam field trials to determine the effectiveness of foam in reducing CO2 channeling, to evaluate the economic potential of the process, and to develop application criteria and procedures. Applying foam resulted in a significant reduction in gas production and yielded indications of increased oil production.

It has been reported that aqueous foams stabilized by particles are much more stable than surfactant or polymer-stabilized foams (Alargova et al., 2004; Binks and Horozov, 2005; Gonzenbach et al., 2006). For example, Cervantes Martinez et al. (2008) showed that it is possible to produce large amounts of foam stabilized only by solid particles. Such foams reportedly have controlled bubble size and can last for months. The enhanced stability reportedly arises from a combination of the adsorption of coated particles around bubbles, preventing coalescence and disproportionation, as well as the reduction in the extent of drainage between bubbles due to increased aqueous phase viscosity of a flocculated dispersion. Singh and Mohanty (2016) studied foam stabilization by in-situ surface-hydrophobization of hydrophilic nanoparticles. In their study, surface-modified nanoparticles (SMNPs) were obtained by partial hydrophobization of alumina-coated silica nanoparticles with a surface modifier. Foams were then stabilized by these SMNPs, in the absence of surfactants, which tended to adsorb at the air/water interface in both bulk and porous media. Espinoza et al. (2010) investigated supercritical CO2-in-water foam generation in bead packs using hydrophilic silica nanoparticles coated with poly(ethylene glycol). The foam generated using nanoparticles had more resistance to flow than the same fluid without nanoparticles.

One of the key factors for the cost associated with surfactant-stabilized foam is the quantity of surfactant required for long-distance propagation of foam from the wellbore (Kibodeaux and Rossen, 1997). Several factors further limit the economic viability of surfactant usage in subsurface applications, including surface adsorption, surfactant loss caused by partitioning into crude oil, and surfactant degradation under harsh reservoir conditions (Grigg and Mikhalin 2007; Chen et al. 2012).

SUMMARY

The present invention provides the design and use of nanoparticle stabilized foamed fluids for hydrocarbon recovery operations.

The foamed fluids constitute a defined combination of base fluid, typically water, surfactant as foam stabilizer, nanoparticles as carrier of the surfactant and gas, resulting in exceptional foam stability and properties suitable for efficient and effective performance of hydrocarbon recovery operations.

The present disclosure describes a design basis for a synergistic combination of surfactant and nanoparticles with exceptional tunable foam stabilizing properties. Combining a suitable type of commercially available surfactant and nanoparticle, and using the concentration ratio of the two, results in a surfactant-decorated nanoparticle mixture. The mixture has unique physical and chemical interaction between the nanoparticle and surfactant, with the liquid/gas interface in the foam, with reservoir fluids such as crude oil and saline water, and with solid surfaces such as rock. This results in unique properties such as i) up to 10-50 fold increase in apparent viscosity of the foam compared to conventional surfactant based foams, ii) significantly reduced volumes of surfactant utilized because a) distribution on nanoparticle; b) strong adherence to the liquid/gas interface minimizing losses due to adsorption on solid surfaces and/or dilution into other liquids such as crude oil and/or saline water. The liquid phase of the foam is typically fresh water and the gas phase is carbon dioxide, nitrogen, methane, produced gas, air, or combinations thereof. The foam quality (ratio between gas/liquid) depends on application and may vary from 50 to 95.

The present invention establishes how the unique properties of the nanoparticle stabilized foamed fluids can be used to improve the efficiency of hydrocarbon recovery operations:

- As injectant fluid for flooding of oil bearing reservoirs (EOR); The high apparent viscosity and long-term stability of the foam enables improved mobility control through the pay zone and improved sweep efficiency of the oil, resulting in recovery levels that would not have been achieved prior to foam injection
- As injectant fluid for energized fracturing of conventional and unconventional formations; The high apparent viscosity and unique properties of the foam enables improved fluid efficiency, more effective placement of the proppant, reduced water volumes, less damage on formation and proppant, resulting in improved Initial Production (IP) and enhanced Estimated Ultimate Recovery (EUR).
- As injectant fluid for well stimulation combining it with other remediation recipes; The high apparent viscosity and stability of the foam enables improved distribution and treatment duration of active components, resulting in improved recovery.
- As injectant fluid for foamed drilling; The high apparent viscosity and stability of the foam enables improved fluid efficiency, more effective debris transport to the surface, resulting in improved efficiency.

The interaction between nanoparticle-surfactant presented here is based on electrostatic interactions to achieve a surfactant-decorated-nanoparticle system which results in a highly stable foam. However, as long as the interaction between surfactant and nanoparticle is strong enough to be transported in porous media, any other forms of attractive interactions (i.e. hydrophobic) will perform similarly.

The surface modification of nanoparticles is a potentially difficult and costly procedure which typically involves using covalently bonded chemicals to change the surface properties of nanoparticles. Surface treatment can be costly, and the treated NP is often tailored to a particular application, hindering the broader development of commercial applications. The present disclosure provides a surface modified nanoparticle without covalent bonding, with demonstrated benefits provided in the context of complex fluids.

DETAILED DESCRIPTION

Figure 2:
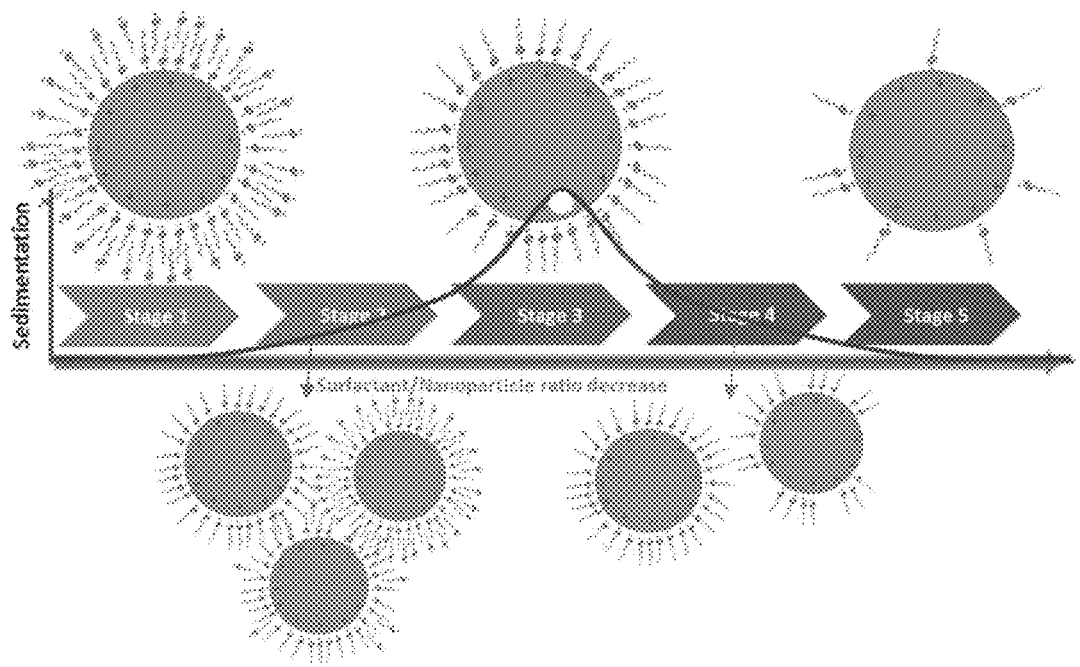
FIG. 2 is a schematic illustration, showing five conceptual stages of nanoparticle (NP) decoration, defined by the concentration ratio of the surfactant-nanoparticle mixture. In an exemplified embodiment, stage 5 (partial coverage of NP by surfactant) resulted in the most stable foam, with step-change dynamic stability during flow in porous media in the presence of oil. Large circles represent positively charged nanoparticles, which are variably covered by surfactant molecules.

The present invention harnesses the synergistic interaction of a nanoparticle and a surfactant, using the concentration ratio of the two components to tune the affinity of the nanoparticle/surfactant mixture for the gas/liquid interface. We define five adsorption stages, as shown in FIG. 2, based on the ratio of surfactant to nanoparticle. Stage 1 and Stage 5 are stable stages, where there is no significant nanoparticle aggregation (sedimentation) and the suspension is stable.

This present invention provides mixtures that include commercially available surfactants and nanoparticles, but is not limited to a certain type of surfactant or NPs. The appropriate ratio (i.e. stage 5 configuration) of either chemical in a mixture results in a foam system which is highly stable and tunable in the presence of high salinity water and crude oil which is crucial for underground applications. The surfactant or nanoparticle alone and more importantly the mixture of surfactant/nanoparticle at other ratios cannot create such a stable foam system. The interaction between nanoparticle and surfactant (electrostatic or hydrophobic interactions or any interactions that provide a system similar to stage 5) is necessary to have such a system. The pretreatment of a nanoparticle surface is not necessary and its mixture with properly selected surfactant (i.e. oppositely charged here) is important. Here we demonstrate the stage 5 configuration with electrostatic interactions between nanoparticle and surfactant (i.e. oppositely charge), however, alternative interactions (i.e. hydrophobic) which result in the stage 5 configuration are also contemplated.

Static Foam Stability without Oil

Figure 3:
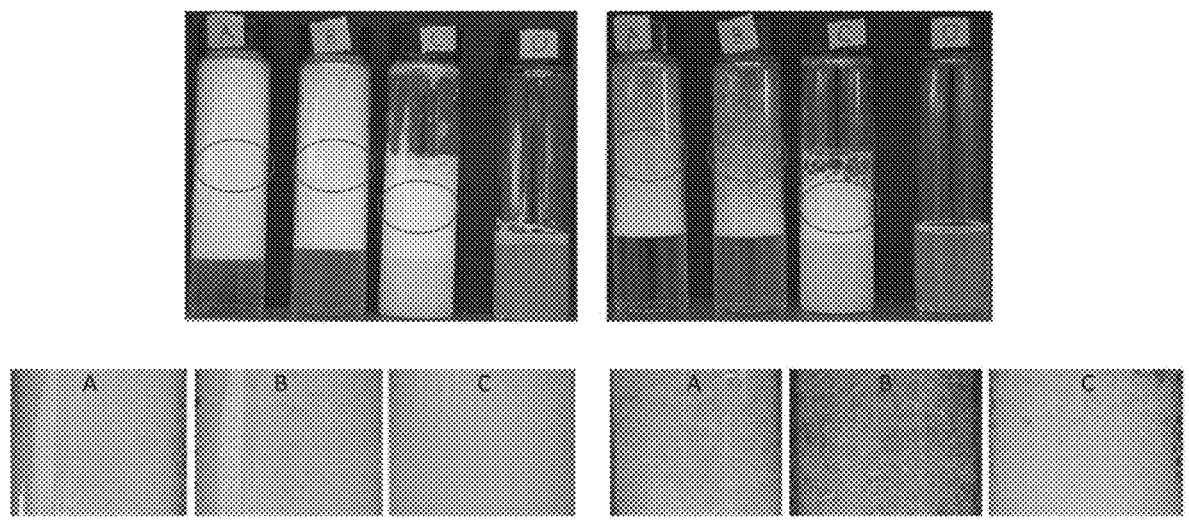
FIG. 3 is a set of photographs, showing stability of foam with time (A) 0.1 wt % surfactant, (B) 0.1 wt % surfactant+ 0.1 wt % NP, (C) 0.1 wt % surfactant+1.5 wt % NP, (D) 1.5 wt % NP. Bottom row shows close-up of foam structure at location indicated by red ovals. Surfactant-only foam (A) and stage 1 foam (B) bubbles expanded, and structure changed from spherical to polyhedral, while stage 5 bubbles (C) remained small and round after 120 minutes. Nanoparticles alone (D) cannot generate foam. Sample C (stage 5) survived for more than a day while samples (A) and (B) collapsed after 6-8 hours.

FIG. 3 shows the foam texture at different times. These tests were conducted at 20° C. and ambient pressure condition. Surfactant foam showed good foamability since the initial foam height was the highest among all the samples. Although the foam height did not change much as time increased, the bubble size expanded, and the bubble structure changed from spherical to polyhedral. Thus the surfactant stabilized foam did not show good stability in the static test. Stage 1 foam behaved similarly to surfactant-only foam, as expected since the nanoparticles are covered with a bilayer of surfactant. Nanoparticles-only solution showed no foaming ability. Only Stage 5 foam showed both foamability and high stability.

Static Foam Test: Effect of Crude Oil and Salinity

Figure 4:
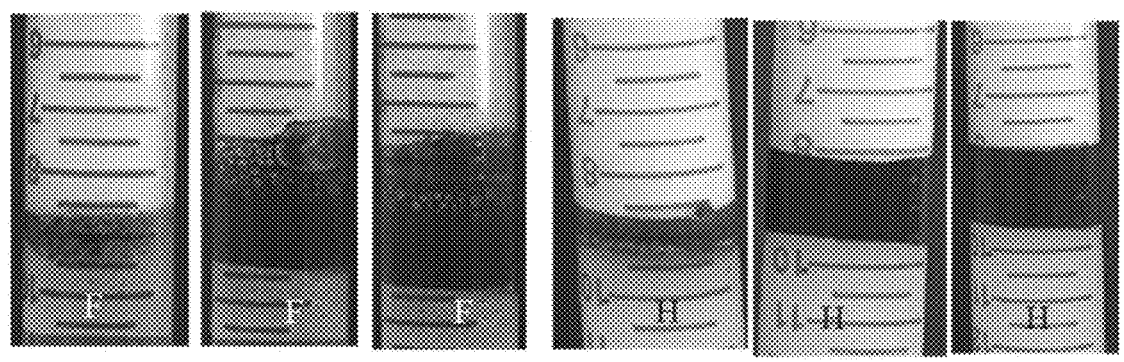
FIG. 4: is a set of photographs, surfactant-only foam (F) and stage 5 foam (H) stability in the presence of heavy oil at 0 min, 30 min and 120 min (left to right).

FIG. 4 shows the static foam stabilities for surfactant-only foam (F), stage 5 foam (H), in the presence of heavy oil. In the surfactant-only system, oil entered the lamella and covered the bubble immediately. This caused small bubbles to break and collapsed the foam in the center of the tube, leaving bubbles only near the tube wall after about 30 minutes. In contrast, partially covered nanoparticles present in the foam structure prevented oil from entering the foam structure. The foam was stable for more than 120 minutes, and the bubble size did not change with the time.

Figure 5:
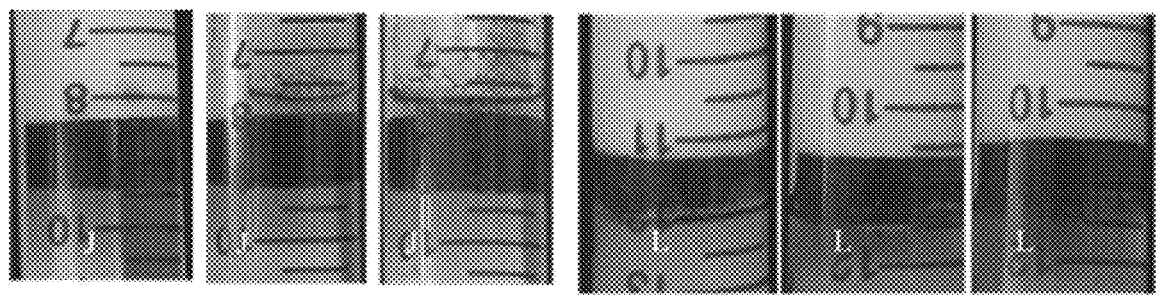
FIG. 5 is a set of photographs, illustrating the stability of surfactant foam with 5.0 wt % NaCl (J) and stage 5 foam with 5.0 wt % NaCl (L) stability in the presence of heavy oil at 0 min, 30 min and 120 min (left to right).

FIG. 5 shows the stability of high salinity foams with the presence of heavy oil. Although salinity slightly improved the surfactant-only foam stability in the presence of oil, the stage 5 foam maintained good oil tolerance in high salinity environment.

Foam Flow in Porous Media in the Absence of Oil: Effect of Salinity

One major drawback of using surfactant stabilized foam in FOR process is surfactant loss due to partitioning into heavy oil which can be mitigated by carefully choosing an oppositely charge nanoparticle as explained here.

The surfactant concentration was set at 0.1 wt % since it is the lowest studied concentration where we can get strong and stable foam in porous media.

Figure 6:
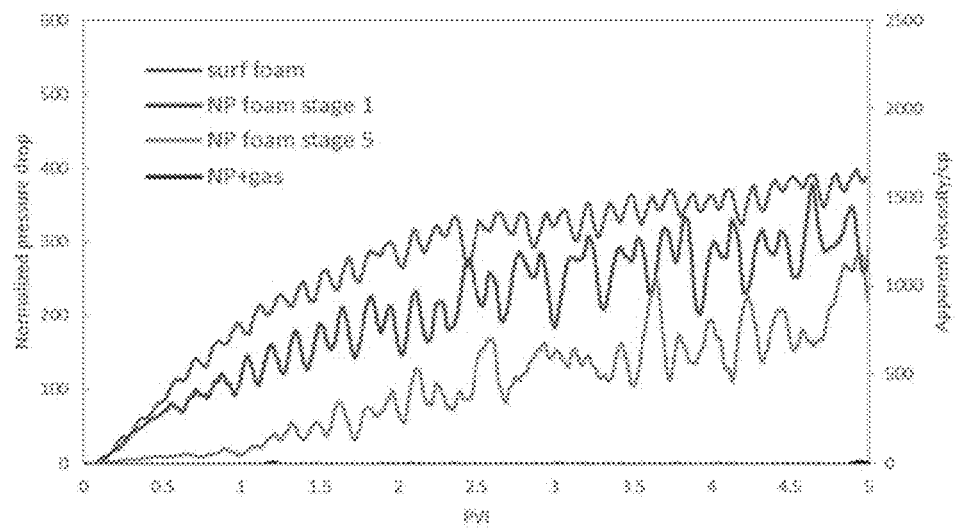
FIG. 6 is a graph, showing the normalized pressure across the sandpack saturated with water of different foaming systems compared with averaged pressure drop of baseline. Baseline is water and gas injection without foam stabilizers.

To compare the performance of foam for mobility control, the baseline was conducted in which DI water and methane gas were co-injected at 1 ml/min with gas/liquid ratio at 4/1. FIG. 6 shows the foam stability and flow behavior of different foaming systems in water saturated sandpacks.

The pressure profile of the flow tests is consistent with the static foam stability results. When the foaming system contained only nanoparticles, it cannot generate foam either in bulk or in the porous media. When the foaming system contained the only surfactant it can generate stable foam in bulk and in the porous media. When the foaming system contained a proper mixture of surfactant and nanoparticles solution, the bilayer coverage foam showed similar foam flow behavior as the surfactant foam, in that the surfactant fully covered the nanoparticles surface, and the mixture behaved like surfactant micelles and buried the nanoparticles. The partial monolayer coverage foam could also generate stable foams inside water-saturated the porous media.

Figure 7:
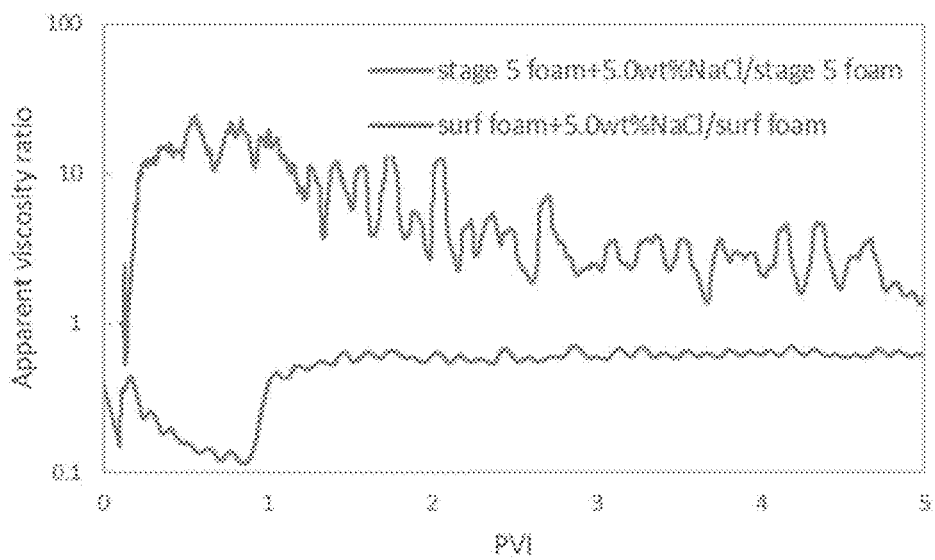
FIG. 7 is a graph illustrating ratio of foam apparent viscosity in high salinity environment to foam in a salt-free system. Stage 5 foam (green curve) demonstrated better flow resistance with 5.0 wt % NaCl solution. In contrast, salinity reduced the apparent viscosity of surfactant-only foam (blue curve).

As seen in FIG. 7, the addition of salt decreases the dynamic stability (i.e. apparent viscosity) of surfactant stabilized foam while interestingly the dynamic stability of foam at stage 5 increases with salt concentration. This performance shows the potential of surfactant/nanoparticle stabilized foam for high salinity conditions for underground applications.

Foam Flow in Porous Media in the Presence of Oil: EOR Potential

The goal of this section is to evaluate the performance and dynamic stability of foam contacting with oil inside a porous media. Foam should be stable in reservoir condition (i.e. high pressure, high salinity, and in contact with oil) to have a potential for EOR and generally underground applications.

Mineral Oil at Residual Oil Saturation

Figure 8:
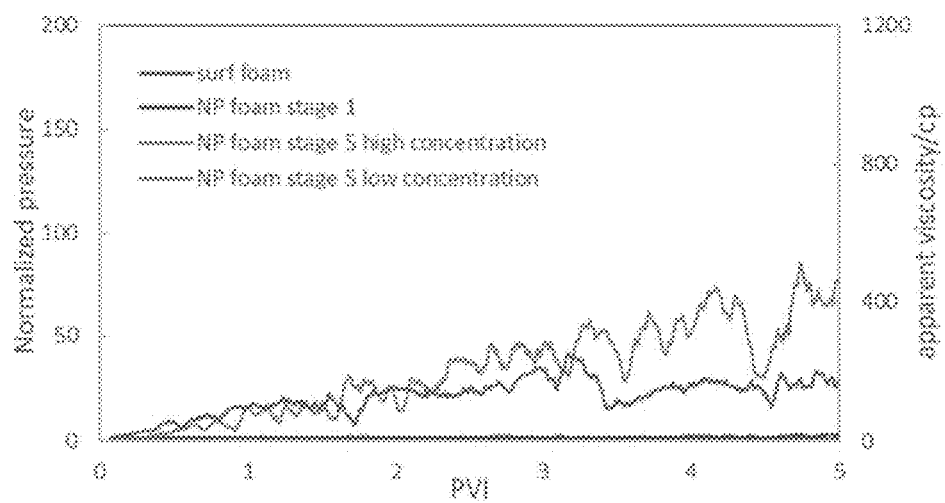
FIG. 8 is a graph illustrating the normalized pressure and apparent viscosity across the sandpack saturated with mineral oil at residual oil saturation to baseline. The baseline is water and gas injection without stabilizers into sandpacks saturated with mineral oil at residual oil saturation (18 cp, 10%). Surfactant-only foam and stage 1 foam collapsed when they encountered residual mineral oil. Stage 5 foam is the only stable system in the presence of mineral oil, and foam viscosity can be tuned based on nanoparticles concentration at stage 5.

After water and oil saturation, waterflood was conducted at 1 ml/min for 3 PV until no significant amount of oil was produced (water cut around 95%) and reached to a residual oil saturation. Thereafter, foam food was performed with different foaming solutions as seen in FIG. 8.

Surfactant-only foam collapsed when it contacted oil, and despite continued injection it did not re-generate within the sandpack. The apparent viscosity of surfactant foam was less than 10 cp. Stage 1 foam also collapsed upon contacting oil. In contrast the apparent viscosity of stage 5 foam was 280 cp at steady state which indicated a stable foam in the presence of residual oil. Apparent viscosity of stage 5 foam at lower nanoparticle concentration (0.1 wt % surfactant and 1 wt % NP) was about 150 cp.

Mineral Oil at Initial Oil Saturation

Figure 9:
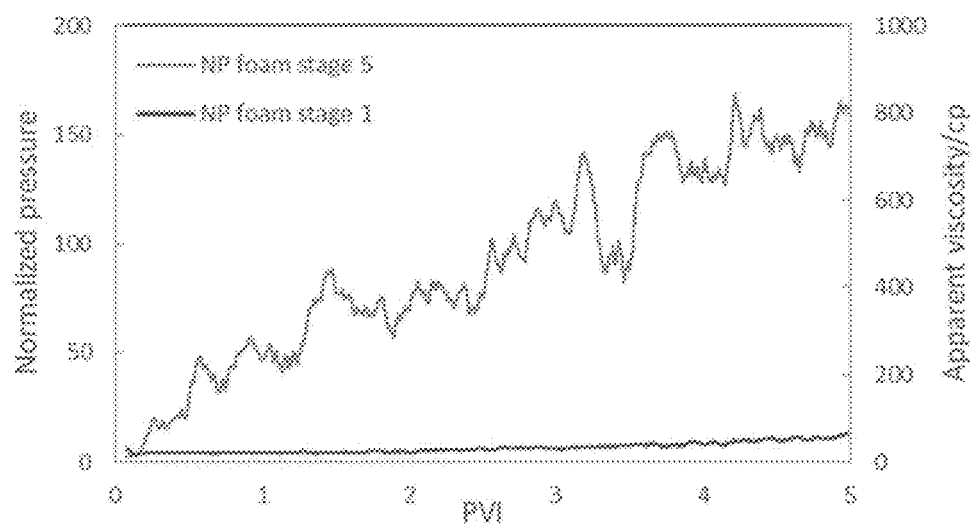
FIG. 9 is a graph illustrating the normalized pressure profile and apparent viscosity of foam in sandpack saturated with mineral oil (18 cp, Soi=90%). Only stage 5 foam remains stable at this condition.

Foam at stage 1 and stage 5 were selected to flow in porous media saturated with mineral oil (initial oil saturation) as seen in FIG. 9. The results indicated foam at stage 5 was the only stable system with the presence of mineral oil. The apparent viscosity of foam at stage 5 and stage 1 at the end of 5 PV injection were about 650 cp and 50 cp, respectively.

Heavy Oil at Residual Oil Saturation

Figure 10:
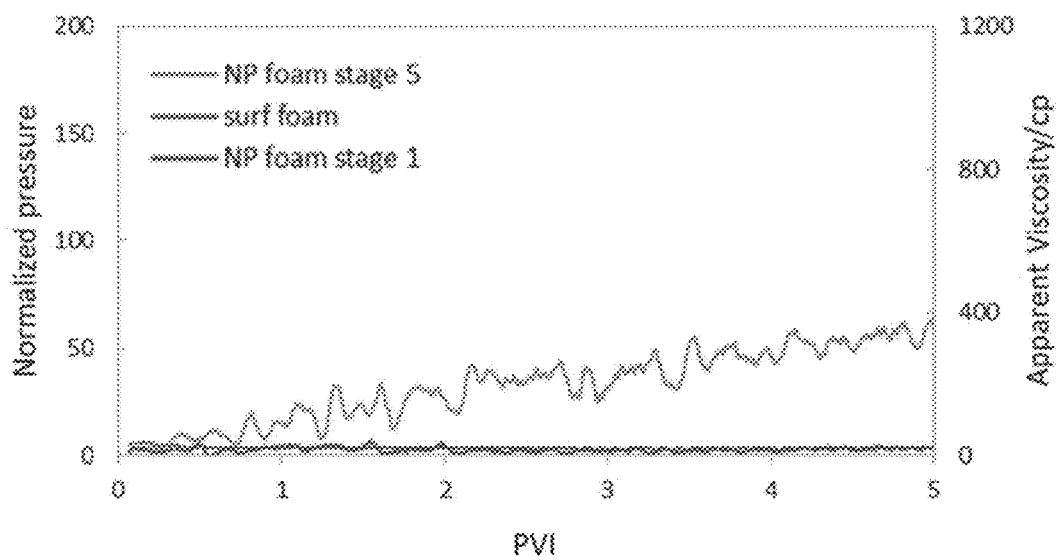
FIG. 10 is a graph illustrating stage 5 foam was stable in the presence of residual heavy oil (508 cp, Sor=40%), stage 1 foam and surfactant-only foam broke after contacting heavy oil.

As shown in FIG. 10, surfactant-only foam and stage 1 foam are not stable when contacting the heavy oil in the sandpack, while stage 5 demonstrated good stability.

Figure 11:
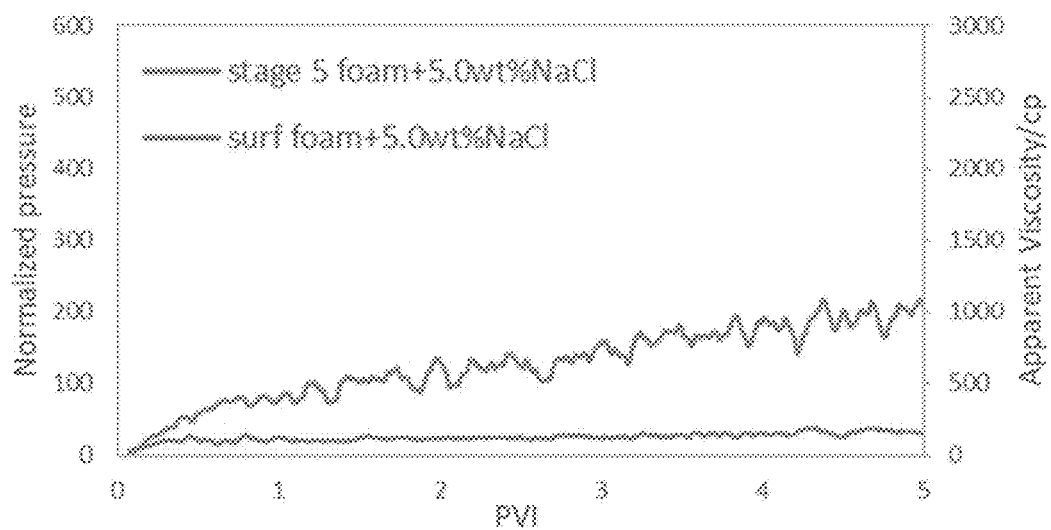
FIG. 11 is a graph illustrating unlike surfactant-only foam, stage 5 foam has both good oil tolerance (508 cp, Sor=40%) and salinity tolerance (5.0 wt % NaCl) in the porous media.
Figure 12:
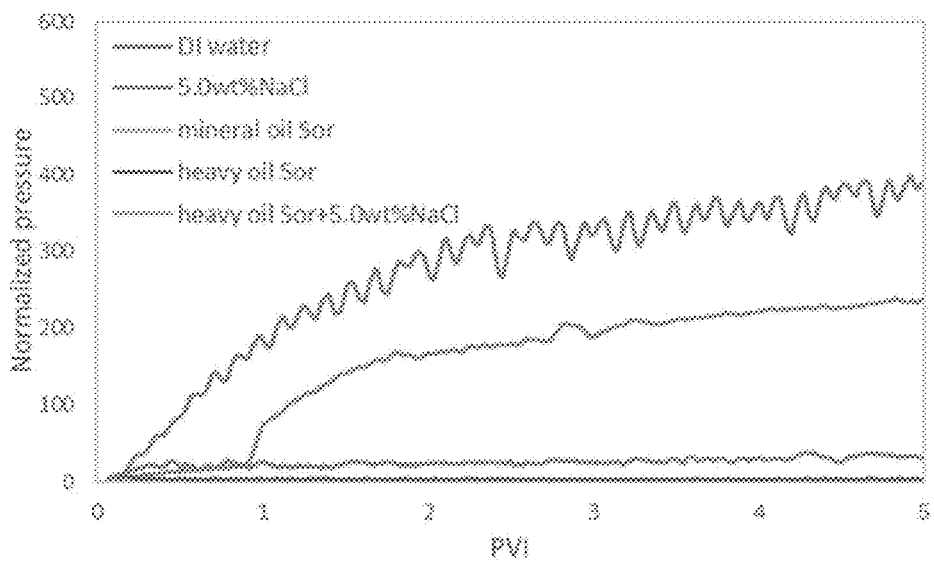
FIG. 12 is a graph illustrating surfactant foam was most stable when there was neither oil nor salt in the system. The presence of oil or salt had detrimental effect on foam stability and flow behavior in the porous media.
Figure 13:
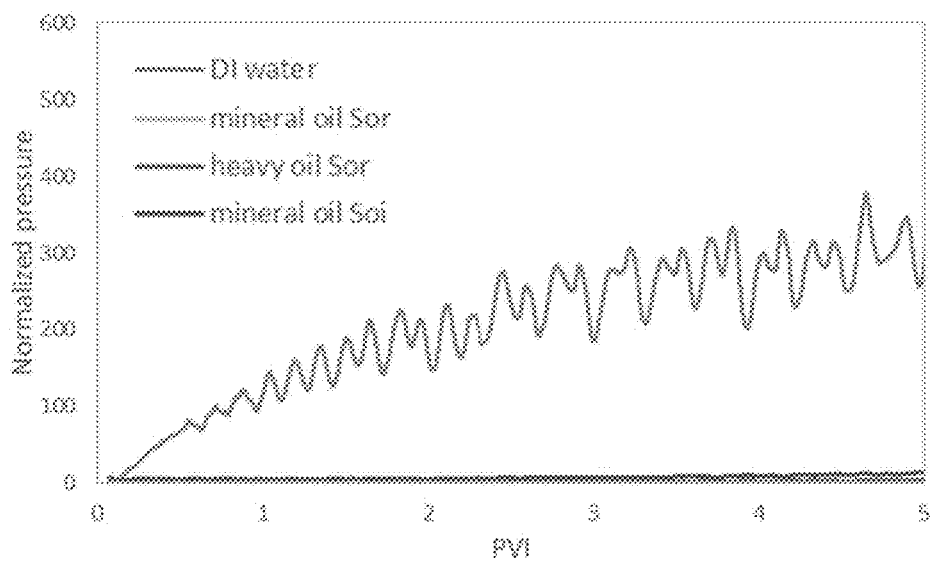
FIG. 13 is a graph illustrating stage 1 foam was only stable when there was no oil or salt in the system. Additional nanoparticles at this stage has no contribution to the foam stability.

The foam flowing test results at residual oil saturation and high salinity condition (5 wt % NaCl), are shown in FIG. 11. Surfactant stabilized was not stable while nanoparticles stabilized foam at stage 5 showed both oil tolerance and salt tolerance in dynamic condition.

Figure 14:
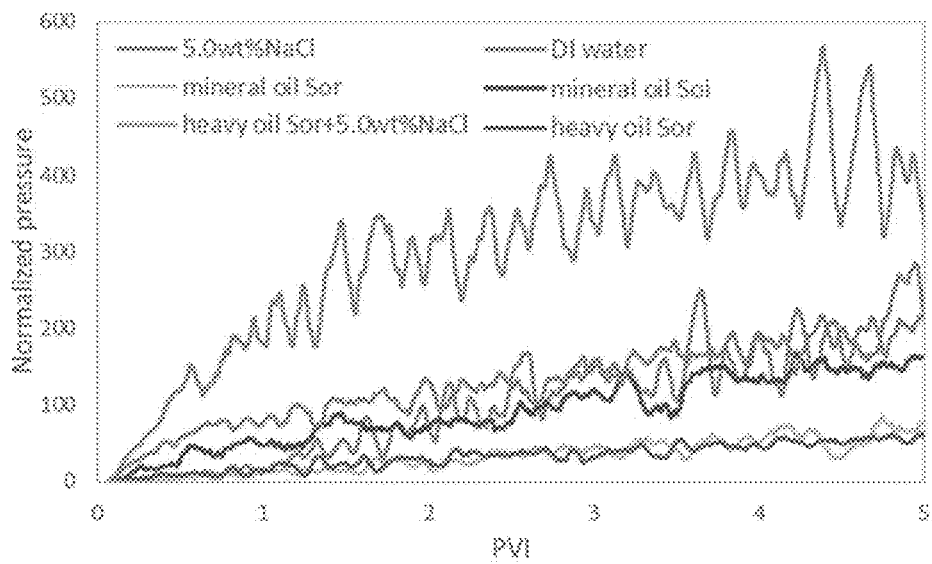
FIG. 14 is a graph illustrating stage 5 foam was the only system that demonstrated good foamability and stability in the presence of oil and salt.

FIG. 14, FIG. 15 and FIG. 16 describe the surfactant foam, stage 1 foam and stage 5 foam flow behaviors in different conditions, respectively. In surfactant foam or stage 1 foam system, the highest foam flow resistance only appeared in water saturated sandpacks, and any addition of oil or salt had a negative effect on foam stability, which limit the further application of surfactant foam or stage 1 foam in the oil field. Synergy effect was achieved only at stage 5 coverage and it was the only stable system in the presence of mobile oil, residual oil or high salinity. High salinity (up to 5.0 wt %) improved the stage 5 foam stability with or without oil in the porous media.

EXAMPLES

These examples, the results of which are discussed above, illustrate the suitability of foams stabilized with a mixture of surfactant and nanoparticles for underground applications (i.e. EOR). Adding the appropriate amount of nanoparticles to the surfactant results in a foam system having a step change performance compared to that of surfactant stabilized foam, particularly for subterranean applications in the presence of oil and high salinity aqueous media.

The results illustrate that the foam is stable at stage 5 (partial coverage of NP with surfactant) when contacting both mineral oil and crude oil. Moreover, the resistance to flow (apparent viscosity) of the foam can be tuned by varying the nanoparticle concentration while keeping the NP surface coverage at partial stage (stage 5), higher nanoparticle concentration yields more flow resistance and a more stable foam.

A mixture of NP and surfactant at an appropriate ratio (stage 5) will demonstrably result in a foam system which is stable in high salinity conditions. Adding salt increased the stage 5 foam stability in porous media and under static testing. In contrast, the stability of foam stabilized by surfactant alone was significantly reduced in the presence of salt and oil.

Example 1: Foam Characteristics

Materials

Alumina-coated silica nanoparticles (ST-AK), containing 17.8% silica and 2% alumina, with a particle size of 10-15 nm—provided by Nissan Chemical Industries Co., Japan—was used as the positive-charged nanoparticle. Sodium fatty alcohol polyoxyethylene ether sulfate (AES: $(CH_3)(CH_2)_{11}O(CH_2CH_2O)_3SO_3Na$) with 70% active content, purchased from Chengdu Aike Chemical Technology Co., China, was used as the anionic surfactant. ST-AK and AES were used without any treatment.

Methods

Sample Preparation

Dispersions were prepared by diluting the desired concentration of AES and ST-AK in separate vials of Milli-Q water, followed by adding the AES solution to the ST-AK solution all at once to ensure a homogeneous dispersion. To avoid any particle aggregation, all dispersions were sonicated using a Branson M2800 ultrasonic bath for 30 minutes. For some dispersions with high concentration and/or high total volume, a QSonica Q700 sonicator was used for 5 minutes to ensure adequate dispersion. In the case of QSonica Q700 sonicator, samples were kept in an ice bath to avoid any temperature increase. It worth mentioning that we used the abovementioned procedure for following results but the mixing procedure is not limited and can be done differently as long as we can achieve a homogenous solution (i.e. no particle sedimentation). For example, the order of mixing and the time and speed of mixing can be changed to achieve a homogenous solution.

Static Foam Test

Preliminary foam tests were conducted by a Bartsch shaking method. 5 ml of foaming solution were shacked vigorously for 20 seconds in a 15 ml plastic tube and then foam height and texture were monitored with time. The gas phase in the static test was air. All the mixed foaming solution were sonicated right before the static test. The static test was conducted at 20° C. and ambient pressure condition.

To observe the effect of oil on bulk foam stability, after foam generation, 1 ml of crude oil (508 cp) was injected into the liquid/foam interface through the liquid phase by a syringe. In the control test, 1 ml of the same foaming solution was injected into the interface by the same process. The bubble structure and foam stability (height) were monitored after contacting the heavy oil.

Foam Flow Test

Figure 1:
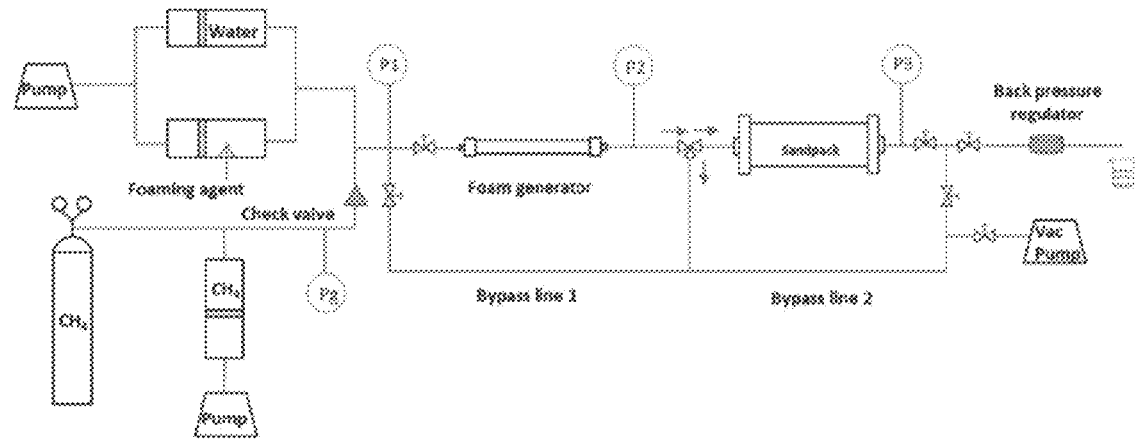
FIG. 1 is a schematic illustration of the exemplified foam flow system.

Foam flood test was conducted in a sandpack with a 1.57 cm in diameter and 30 cm length. A foam generator (0.46 cm and 15 cm in diameter and length, respectively) was used to pre-generate the foam as shown in FIG. 1. The foam generator was packed with silica sand (100-140 mesh, provided by US Silica) and the sandpack was packed with silica sand (50-70 mesh, provided by US Silica) before each flood test. The sandpack was dry packed with vibration method. The properties (i.e. porosity and permeability) of sandpack and foam generator were kept the same for all tests as seen in Table 2. The gas/liquid ratio was set at 4/1 at the inlet of the foam generator corresponding to a foam quality of 80% at the inlet. The total injection rate was set at 1 ml/min. All flow tests were conducted under ambient temperature and pressure of 4 MPa (580 psi).

After packing the sandpack, the whole system was vacuumed and then saturated with DI water to determine porosity and then the permeability.

Methane gas and the foaming solution were co-injected into the foam generator until reached to a steady-state (stable pressure) before switching to the sandpack. The pre-generated foam was then injected into the sandpack. The downstream pressure of the experiment was maintained by a backpressure regulator (BPR), and the backpressure was set at 4 MPa. There were three pressure transducers installed at the inlet of the foam generator, between the foam generator and the sandpack, and the outlet of the sandpack. The transducers recorded the absolute pressure at the same time. The pressure difference across the foam generator and the sandpack were recorded as an indicator of foam stability inside the porous media.

Example 2: Oil Displacement

Oil displacement experiments evaluated foam generation and propagation behavior in the presence of mineral oil or heavy oil at initial or residual oil saturation. The dynamic stability of foam generated with surfactant alone was compared to that of surfactant+nanoparticles at different surface coverage (concentrating ratio). Oil saturation was performed at 1 ml/min until no water was produced at the outlet. The sandpack was placed horizontal and aged overnight to reach an equilibrium state. If the experiments were conducted at initial oil saturation, the foam pre-generation process and the foam injection process are the same as the foam flow test explained above. If the experiments were conducted at residual oil saturation, waterflood was performed at 1 ml/min ahead of the foam injection for about 3 PV.

REFERENCES

Heuer, G. J., Jacocks, C. L., 1968. Control of gas-oil ratio in producing wells, U.S. Pat. No. 3,368,624.

Harris, P. C., & Heath, S. J. (1996, Jan. 1). High-Quality Foam Fracturing Fluids. Society of Petroleum Engineers. doi:10.2118/35600-MS Patzek, T. W., 1996. Field Applications of Steam Foam for Mobility Improvement and Profile Control. SPERE 11 (2): 79-86.

Hirasaki, G. J., 1989. The Steam-Foam Process. J. Petr. Technol. 41 (05): 449-456.

Smith D H. (ed.). 1988. Surfactant-Based Mobility Control: Progress in Miscible-Flood Enhanced Oil Recovery. ACS Symp. Ser. No. 373, Am. Chem. Soc., Washington, D.C.

Lake, L., W., 1989. Enhanced oil recovery, Englewood Cliffs, N.J., Prentice Hall, 550 p.

Zhang, Y., Yue, X., Dong, J., and Yu, L., 2000. New and Effective Foam Flooding to Recover Oil in Heterogeneous Reservoir. Paper SPE 59367 presented at the SPE/DOE Improved Oil Recovery Symposium, 3-5 April, Tulsa, Okla.

Hoefner, M. L., Evans, E. M., Buckles, J. J., Jones, T. A., 1995. CO2 foam: results from four developmental field trials. SPERE 10 (4), 273-281.

Alargova, R. G., Warhadpande, D. S., Paunov, V. N., and Velev, O. D. 2004. Foam Superstabilization by Polymer Microrods. Langmuir 20 (24): 10371-10374.

Binks, B. P., and Horozov, T. S. 2005. Aqueous foams stabilized solely by silica nanoparticles. Angew. Chem., Int. Ed., 44 (24): 3722-3725.

Gonzenbach, U. T., Studart, A. R., Tervoort, E., and Gauckler, L. J., 2006. Ultrastable Particle-Stabilized Foams. Angew. Chem., Int. Ed. 45 (21): 3526-3530.

Cervantes Martinez, A., Rio, E., Delon, G., SaintJalmes, A., Langevin, D., & Binks, B. P. (2008). On the origin of the remarkable stability of aqueous foams stabilised by nanoparticles: link with microscopic surface properties. Soft Matter 4, 1531. https://doi.org/10.1039/b804177f Singh, R., and Mohanty, K. K., 2016. Foams Stabilized by In-Situ Surface-Activated Nanoparticles in Bulk and Porous Media. SPEJ, 21 (01): 21-130.

Espinoza D A, Caldelas F M, Johnston K P, Bryant S L, Huh C (2010) Nanoparticle-stabilized supercritical CO2 foams for potential mobility control applications. SPE Improved Oil Recovery Symposium, Tulsa, Okla. Society of Petroleum Engineers.

Kibodeaux, K. R. and Rossen, W. R., 1997. Coreflood Study of Surfactant-Alternating-Gas Foam Processes: Implications for Field Design. Paper SPE 38318 presented at the SPE Western Regional Meeting, 25-27 June, Long Beach, Calif., USA.

Grigg, R. B. and Mikhalin, A. A., 2007. Effects of Flow Conditions and Surfactant Availability on Adsorption. Paper SPE 106205 presented at the International Symposium on Oilfield Chemistry, 28 February-2 March, Houston, Tex., USA.

Chen, Y., Elhag, A. S., Poon, B. M., Cui, L., Ma, K., Liao, S. Y., Omar, A., Worthen, A., Hirasaki, G. J., Nguyen, P. Q., and Johnston, K. P., 2012. Ethoxylated Cationic Surfactants for CO2 FOR in High Temperature, High Salinity Reservoirs. Paper SPE 154222 presented at the SPE Improved Oil Recovery Symposium, 14-18 April, Tulsa, Okla., USA.

Kolb, B. U., Baran, R. J., Johnson, A. M., Johnson, G. G., Lehmann, P. M., Sokalski, S. J., 2003. Foam including surface-modified nanoparticles. U.S. Pat. No. 6,586,483.

The invention claimed is:

1. A method of controlling mobility of subsurface fluids in a hydrocarbon reservoir by deploying a stabilized subterranean foam, the foam comprising a partially surfactant-decorated nanoparticle, wherein the nanoparticle has a diameter of 10-15 nm and comprises a charged surface characterized by a capacity to bear a charge, and an oppositely-charged ionic surfactant non-covalently decorating only a portion of the charged surface of the nanoparticle, the method comprising:

providing the surfactant and the nanoparticle in the foam in a surfactant concentration and a nanoparticle concentration of greater than 1 weight %, the nanoparticle and the surfactant thereby being provided in a nanoparticle/surfactant concentration ratio in the foam so that the surfactant only partially covers the nanoparticle and so that there is no nanoparticle aggregation, thereby forming a stable suspension of individual partially surfactant-decorated nanoparticles in the foam; and providing the partially surfactant-decorated nanoparticle in the foam in a surfactant-decorated nanoparticle concentration selected so as to stabilize the foam in the subterranean presence of a hydrocarbon fluid and/or in the subterranean presence of a saline aqueous fluid, and wherein the nanoparticle/surfactant concentration ratio and the partially surfactant-decorated nanoparticle concentration are selected in combination to increase subterranean stability of the foam in contact with the hydrocarbon fluid and/or the saline aqueous fluid compared to the subterranean stability of a foam having a different nanoparticle/surfactant concentration ratio and/or a different surfactant-decorated nanoparticle concentration; and deploying the foam in the reservoir so that the stabilized foam contacts the hydrocarbon fluid and/or the saline aqueous fluid to constrain the subterranean movement of the hydrocarbon fluid and/or the saline aqueous fluid.

2. The method of claim 1, wherein the nanoparticle is comprised of a metal or metalloid oxide, carbon nanotubes, cellulose nanocrystals or a mixture thereof.

3. The method of claim 2, wherein the metal or metalloid oxide is silicon oxide, iron oxide or aluminum oxide.

4. The method of claim 1, wherein the surfactant comprises: a sulfonate, a betaine, an amino acid derivative, an ethoxylated linear paraffin, an olefin, an alkylate, a soap; a carboxylate, a linear alkyl-amine, or an alkyl-ammonium.

5. The method of claim 1, wherein the foam comprises a gas phase, and the gas phase comprises $N_2$, $CO_2$, air, $CH_4$ or mixtures thereof.

6. The method of claim 1, wherein the nanoparticle concentration in the foam is at most 10 wt. %.

7. The method of claim 1, wherein the surfactant concentration in the foam is from 0.01 to 2 weight %.

8. The method of claim 1, wherein the surfactant concentration is at least 0.1 weight %.

9. A method of controlling mobility of subsurface fluids in a hydrocarbon reservoir by deploying a stabilized subterranean foam, the foam comprising a partially surfactant-decorated nanoparticle, wherein the nanoparticle has a diameter of 10-15 nm and comprises a charged surface characterized by a capacity to bear a charge, and an oppositely-charged ionic surfactant non-covalently decorating only a portion of the charged surface of the nanoparticle, the method comprising:

providing the surfactant and the nanoparticle in the foam in a surfactant concentration and a nanoparticle concentration of greater than 1 weight %, the nanoparticle and the surfactant thereby being provided in a nanoparticle/surfactant concentration ratio in the foam so that the surfactant only partially covers the nanoparticle and so that there is no nanoparticle aggregation, thereby forming a stable suspension of individual partially surfactant-decorated nanoparticles in the foam; and providing the partially surfactant-decorated nanoparticle in the foam in a surfactant-decorated nanoparticle concentration selected so as to stabilize the foam in the subterranean presence of a hydrocarbon fluid and/or in the subterranean presence of a saline aqueous fluid, wherein the nanoparticle/surfactant concentration ratio and the partially surfactant-decorated nanoparticle concentration are selected in combination to stabilize the foam in contact with the hydrocarbon fluid and/or the saline aqueous fluid for more than 120 minutes; and wherein the nanoparticle/surfactant concentration ratio and the surfactant-decorated nanoparticle concentration are selected in combination to increase subterranean stability of the foam in contact with the hydrocarbon fluid and/or the saline aqueous fluid compared to the subterranean stability of a foam having a different nanoparticle/surfactant concentration ratio and/or a different surfactant-decorated nanoparticle concentration; and deploying the foam in the reservoir so that the stabilized foam contacts the hydrocarbon fluid and/or the saline aqueous fluid to constrain the subterranean movement of the hydrocarbon fluid and/or the saline aqueous fluid.

* * * * *